United States Patent
Hanneman

(10) Patent No.: US 8,200,180 B2
(45) Date of Patent: Jun. 12, 2012

(54) SYSTEM AND METHOD FOR ENHANCING SENSITIVITY OF NARROW INFORMATION BANDWIDTH RECEIVERS

(75) Inventor: Charles Keith Hanneman, Olathe, KS (US)

(73) Assignee: Honeywell International Inc., Morristown, NJ (US)

(*) Notice: Subject to any disclaimer, the term of this patent is extended or adjusted under 35 U.S.C. 154(b) by 336 days.

(21) Appl. No.: 12/466,173

(22) Filed: May 14, 2009

(65) Prior Publication Data

US 2010/0291893 A1   Nov. 18, 2010

(51) Int. Cl.
*H04B 1/06* (2006.01)
*H04B 7/00* (2006.01)

(52) U.S. Cl. ............ 455/254; 455/278.1; 455/311; 455/230

(58) Field of Classification Search ......... 455/91–355
See application file for complete search history.

(56) References Cited

U.S. PATENT DOCUMENTS

| | | | |
|---|---|---|---|
| 5,323,332 A * | 6/1994 | Smith et al. ............ | 702/106 |
| 5,649,321 A | 7/1997 | Kellenberger | |
| 5,867,535 A * | 2/1999 | Phillips et al. .......... | 375/295 |
| 5,901,344 A | 5/1999 | Opas | |
| 7,292,830 B1 | 11/2007 | Cheung et al. | |
| 2004/0213366 A1 | 10/2004 | Ono | |
| 2005/0046482 A1 | 3/2005 | Schrodinger | |
| 2005/0164665 A1 * | 7/2005 | Suganuma .............. | 455/278.1 |
| 2006/0227898 A1 * | 10/2006 | Gibson et al. ........... | 375/316 |
| 2009/0084853 A1 | 4/2009 | Giebel et al. | |

OTHER PUBLICATIONS

Denk, Aytug, "Detection and Jamming Low Probability of Intercept (LPI) Radars", "Master's Thesis", Sep. 2006, Publisher: Naval Postgraduate School, Published in: Monterey, CA.
European Patent Office, "European Search Report", Oct. 7, 2010, Published in: EP.

* cited by examiner

*Primary Examiner* — Lincoln Donovan
*Assistant Examiner* — Brandon S Cole
(74) *Attorney, Agent, or Firm* — Fogg & Powers LLC

(57) ABSTRACT

A radio frequency (RF) receiver having enhanced sensitivity is provided. In one embodiment, the receiver comprises at least one antenna, a preselector unit operative to receive an RF signal from the at least one antenna and output a preselected RF signal, and a frequency synthesizer operative to generate a signal at a predetermined synthesizer frequency. A mixer is operative to multiply the preselected RF signal and the predetermined synthesizer frequency and output a product signal. The receiver also includes an intermediate frequency (IF) filter unit that is operative to receive the product signal from the mixer and output an IF signal. The IF filter unit includes one or more narrow bandwidth filters having a bandwidth adequate to transmit information of interest. At least one of the narrow bandwidth filters comprises a carrier filter.

18 Claims, 2 Drawing Sheets

SYSTEM AND METHOD FOR ENHANCING SENSITIVITY OF NARROW INFORMATION BANDWIDTH RECEIVERS

BACKGROUND

Current radio receivers have a receiver bandwidth equal to or greater than the assigned channel information bandwidth plus receiver and transmitter frequency stability tolerances. This limits the sensitivity of the radio receiver more than is necessary due to this larger than necessary bandwidth.

SUMMARY

The present invention relates to a radio frequency (RF) receiver having enhanced sensitivity. In one embodiment, the receiver comprises at least one antenna, a preselector unit operative to receive an RF signal from the at least one antenna and output a preselected RF signal, and a frequency synthesizer operative to generate a signal at a predetermined synthesizer frequency. A mixer is operative to multiply the preselected RF signal and the predetermined synthesizer frequency and output a product signal. The receiver also includes an intermediate frequency (IF) filter unit that is operative to receive the product signal from the mixer and output an IF signal. The IF filter unit includes one or more narrow bandwidth filters having a bandwidth adequate to transmit information of interest. At least one of the narrow bandwidth filters comprises a carrier filter.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a system and method for enhancing sensitivity of narrow information bandwidth receivers. The present approach uses a receiver pre-detection bandwidth that is just adequate to respond to a required rate of information change. This results in a much narrower noise bandwidth for the receiver, and thereby increases the radio frequency (RF) sensitivity of the receiver. In addition, a receiver detector output amplitude is much less sensitive to noise interference than in conventional receivers.

Figure 1:
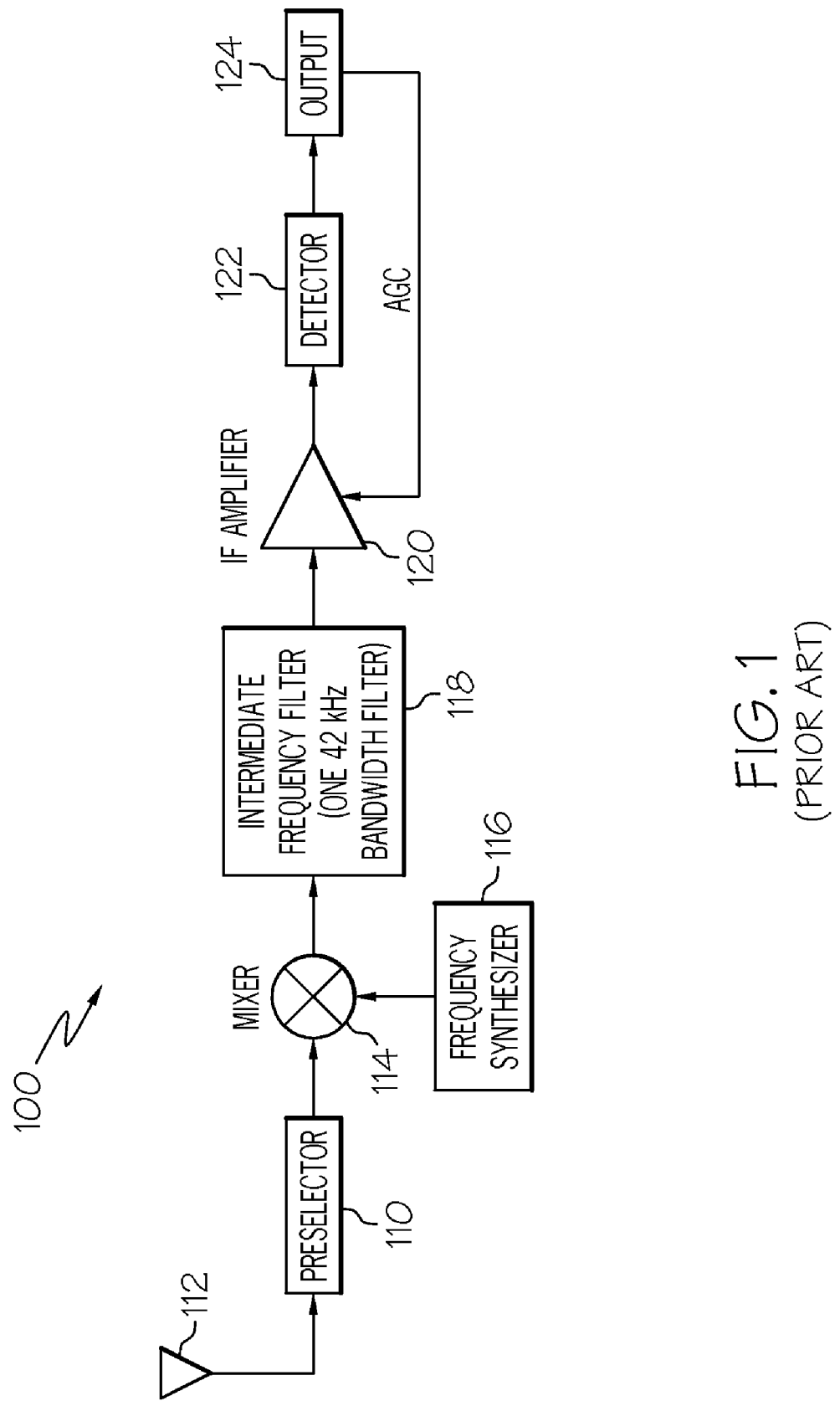
FIG. 1 is a block diagram of a conventional Glide Slope receiver.

A conventional Glide Slope RF receiver controls receiver gain by adjusting the gain based on the total output of the receiver detector. For example, FIG. 1 illustrates a conventional Glide Slope receiver 100. The receiver 100 includes a preselector 110 that receives an input signal from an antenna 112. The preselector 110 outputs a signal to a mixer 114, which also receives a signal from a frequency synthesizer 116. The mixer 114 combines the signals from preselector 110 and frequency synthesizer 116 and outputs a combined signal to an intermediate frequency (IF) filter 118. The IF filter 118 typically includes one 42 kHz bandwidth filter. The IF filter 118 outputs an IF signal to an IF amplifier 120, which sends an amplified signal to a detector 122. An output signal 124 is then transmitted from detector 122 for further use by a Glide Slope post detection processing system coupled to receiver 100. The output signal 124 is also used as an automatic gain control (AGC) signal that is fed back to IF amplifier 120, and as an output that is further processed for display to a pilot.

In the proposed technique, the information used for gain control is only the information of interest (e.g., narrowbandwidth information in Glide Slope), which excludes almost all of the noise present in the required pass band of the receiver. This results in a much more sensitive receiver than required by the overall system requirements, and allows for a lower cost front end design to be used, which reduces the overall cost of the receiver system compared to conventional systems.

The proposed approach can be employed in any radio receiver that receives data with known modulation frequencies or frequency bands. Such receivers include, but are not limited to, avionic navigation receivers such as very high frequency (VHF) OmniRange (VOR) receivers, Localizer (LOC) receivers, Glide Slope receivers, and the like.

Figure 2:
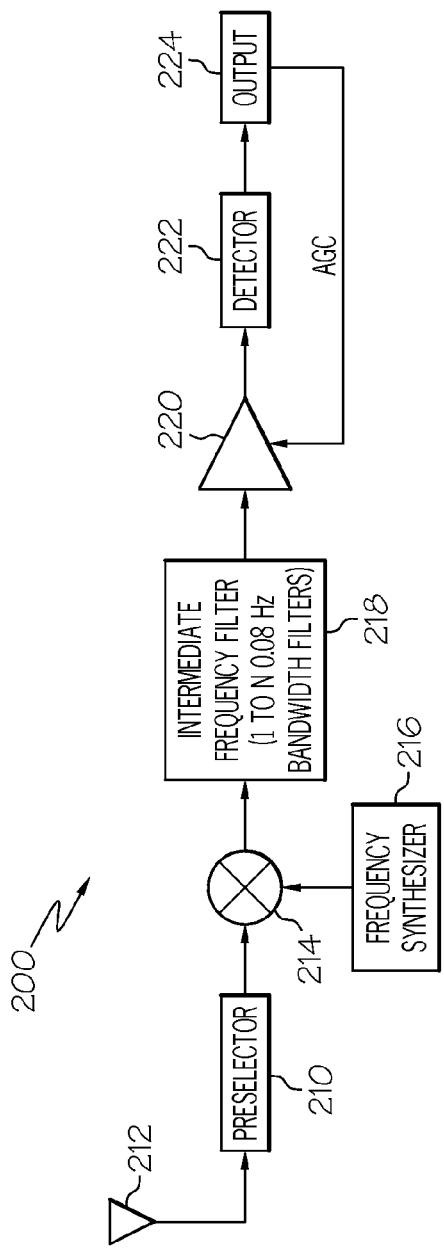
FIG. 2 is a block diagram of an analog receiver according to one embodiment of the invention.

FIG. 2 illustrates an analog receiver 200, such as a Glide Slope receiver used in aircraft navigation systems, according to one embodiment of the invention. The receiver 200 includes a preselector unit 210 that is operative to receive an RF signal from at least one antenna 212. The preselector unit 210 can include one or more RF filters and possibly an RF amplifier. A filtered signal is output from preselector unit 210 to a mixer 214. A frequency synthesizer 216 generates a signal at a predetermined frequency and outputs the signal to mixer 214. The mixer 214 multiplies the signals from preselector unit 210 and frequency synthesizer 216, and outputs the product signals to an intermediate frequency (IF) filter unit 218.

The IF filter unit 218 includes one or more narrow bandwidth filters (e.g., 1 to N). Each of the filters can have a bandwidth adequate to transmit the information of interest, and in the case of Glide Slope implementations the filters can have a bandwidth of up to about 0.08 Hz. The IF filter unit 218 outputs an IF signal to an IF amplifier 220, which in turn sends the amplified signal to a detector 222. An output signal 224 is transmitted from detector 222 for further use by a communication or navigation system operatively coupled to receiver 200. The output signal 224 can include, for example, deflection information for a Glide Slope indicator in a cockpit of an aircraft. The output signal 224 can also be used as an AGC signal that is fed back to IF amplifier 220.

In one exemplary embodiment for a single carrier system, IF filter unit 218 includes five (5) very narrow bandwidth filters. These filters are used to individually pass: a carrier (first filter), two 90 Hz sidebands (second and third filters), and two 150 Hz sidebands (fourth and fifth filters). In one implementation, the five (5) filters are each at about 0.08 Hz, such that the total bandwidth of the filters is about 0.4 Hz.

In another exemplary embodiment for a multi-carrier system, the IF filter 218 includes ten (10) very narrow bandwidth filters that are used to individually pass the carrier and sideband signals. In one implementation, the ten (10) filters are each at about 0.08 Hz, such that the total bandwidth of the filters is about 0.8 Hz.

In other embodiments for single and multi-carrier systems, the carrier filter bandwidth can be much less than about 0.08 Hz, dependent on the information transmission time response requirements. For example, the carrier filter can be a tracking filter, which only has to track aircraft Doppler after acquisition of the carrier signal. The corresponding sideband filters can have bandwidths approaching the 0.08 Hz system bandwidth, with a two (2) second time response.

Assuming that 0.08 Hz is used for all of the filters in an exemplary embodiment, the receiver bandwidth would be 0.08 times 5 (or 10 for multicarrier systems), yielding a total receiver bandwidth of 0.4 Hz (0.8 Hz for multicarrier systems). This would allow the detector to operate in a noise environment that is improved by 10*log(42,000/0.4)=50 dB (47 dB for multicarrier systems), thereby increasing the RF sensitivity of the receiver. Since this increased sensitivity is not necessarily needed for the overall system requirements, a lower cost or smaller receiver preselector, mixer, or equivalent function portions (e.g., analog to digital converters for digital receivers) can be used.

In a Glide Slope receiver, indicator pointer drive information is contained in 90 Hz and 150 Hz bandwidths, +/−1% modulation, on the 229.15 to 335 MHz AM carrier. There are no identification or audio outputs for the Glide Slope. The indicator pointer response time requirement is that at least 67% deflection be reached within 2 seconds. This requires an indicator drive system bandwidth of approximately 0.08 Hz. By contrast, in conventional systems, this bandwidth is typically set at a point in the receiver processing after the AM detection and 90/150 Hz recovery. The overall receiver pass band response is typically +/−21 kHz plus receiver frequency tolerances, at a minimum, in such conventional systems. Accordingly, the present approach provides a significant reduction in the required receiver bandwidth compared to conventional receivers.

Figure 3:
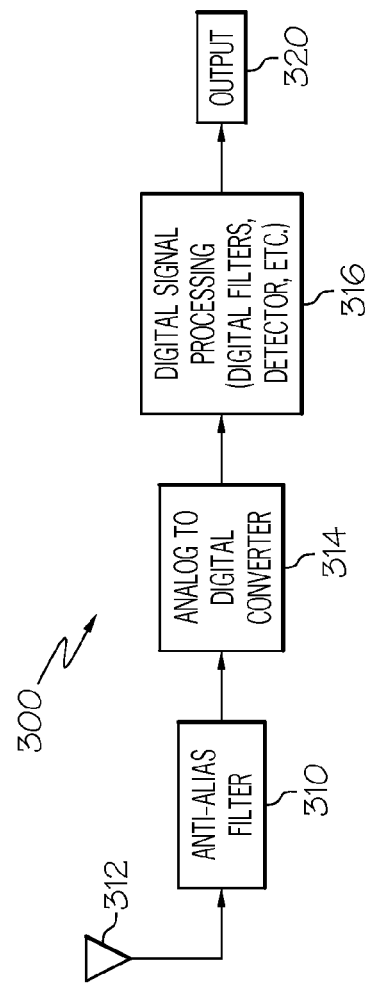
FIG. 3 is a block diagram of a digital receiver according to another embodiment of the invention.

FIG. 3 illustrates a digital receiver 300, which can be implemented as a Glide Slope receiver, according to another embodiment of the invention. The receiver 300 includes an anti-alias filter 310 that is operative to receive an RF signal from at least one antenna 312. The anti-alias filter 310 outputs the filtered RF signal to an analog to digital converter 314, which in turn transmits a digital signal to a digital signal processing (DSP) unit 316, which includes IF filtering functions. For example, one or more digital filters, such as finite impulse response (FIR) filters, can be employed in DSP unit 316. The digital filters can process the digital signal to produce an IF signal for single or multi-carrier systems. The IF signal produced by the digital filters in DSP unit 316 can have a narrow bandwidth, similar to or the same as the IF signal produced by one or more analog IF filters as discussed for receiver 200. The DSP unit 316 can also include detector, AGC, and display filtering functions. An output signal 320 is transmitted from DSP unit 316 for further use by a communication or navigation system operatively coupled to receiver 300.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A radio frequency (RF) receiver, comprising:
at least one antenna;
a preselector unit operative to receive an RF signal from the at least one antenna and output a preselected RF signal;
a frequency synthesizer operative to generate a signal at a predetermined synthesizer frequency;
a mixer operative to multiply the preselected RF signal and the predetermined synthesizer frequency and output a product signal; and
an intermediate frequency (IF) filter unit operative to receive the product signal from the mixer and output an IF signal, the IF filter unit including a plurality of narrow bandwidth filters each having a bandwidth that only responds to a required rate of information change, wherein at least one of the narrow bandwidth filters comprises a carrier filter.

2. The receiver of claim 1, further comprising:
an IF amplifier operative to receive the IF signal from the IF filter unit; and
a detector operative to receive an amplified IF signal from the IF amplifier.

3. The receiver of claim 1, wherein the receiver is implemented in a single carrier system.

4. The receiver of claim 3, wherein the IF filter unit includes five narrow bandwidth filters.

5. The receiver of claim 1, wherein the receiver is implemented in a multi-carrier system.

6. The receiver of claim 5, wherein the IF filter unit includes ten narrow bandwidth filters.

7. The receiver of claim 1, wherein the narrow bandwidth filters each have a bandwidth of up to about 0.08 Hz.

8. The receiver of claim 1, wherein the receiver comprises an avionic very high frequency (VHF) navigation receiver, a localizer receiver, or a glide slope receiver.

9. A radio frequency (RF) receiver, comprising:
at least one antenna;
an anti-alias filter operative to receive an RF signal from the at least one antenna;
an analog to digital converter operative to receive a filtered signal from the anti-alias filter and convert the filtered signal to a digital signal; and
a digital signal processor operative to receive the digital signal from the analog to digital converter, the digital signal processor including a plurality of digital filters each having a narrow bandwidth just wide enough to respond to a required rate of information change, wherein at least one of the digital filters comprises a carrier filter.

10. The receiver of claim 9, wherein the digital signal processor includes five digital filters.

11. The receiver of claim 9, wherein the digital signal processor includes ten digital filters.

12. The receiver of claim 9, wherein the digital filters each have a bandwidth of up to about 0.08 Hz.

13. The receiver of claim 9, wherein the digital filters comprise finite impulse response filters.

14. The receiver of claim 9, wherein the receiver comprises an avionic navigation receiver, a localizer receiver, or a glide slope receiver.

15. A method for enhancing sensitivity of a radio frequency (RF) receiver, the method comprising:
providing an RF receiver comprising an intermediate frequency (IF) filter unit including a plurality of narrow bandwidth filters each having a bandwidth that only responds to a required rate of information change, wherein at least one of the narrow bandwidth filters comprises a carrier filter;
receiving a transmitted signal at the IF filter unit;
filtering the transmitted signal in the IF filter unit to find a carrier signal;
determining one or more modulation frequencies for the carrier signal; and
fixing one or more sideband frequencies after the modulation frequencies are determined.

16. The method of claim 15, wherein the receiver comprises an avionic VHF navigation receiver, a localizer receiver, or a glide slope receiver.

17. The method of claim 15, wherein the IF filter unit includes five narrow bandwidth filters.

18. The method of claim 15, wherein the IF filter unit includes ten narrow bandwidth filters.

* * * * *